United States Patent [19]

Adolfsson

[11] 4,350,188
[45] Sep. 21, 1982

[54] MOBILE MACHINE FOR PROCESSING TREES AND TRUNKS

[75] Inventor: Bertil Adolfsson, Umea, Sweden

[73] Assignee: Kockums Industri AB, Soderhamn, Sweden

[21] Appl. No.: 55,754

[22] Filed: Jul. 9, 1979

Related U.S. Application Data

[63] Continuation of Ser. No. 807,188, Jun. 16, 1977, abandoned.

[30] Foreign Application Priority Data

Jul. 17, 1976 [SE] Sweden ................................ 7606949
Sep. 3, 1976 [SE] Sweden ................................ 7609771

[51] Int. Cl.³ .......................... A01G 23/08; B27L 1/00
[52] U.S. Cl. ..................................................... 144/2 Z
[58] Field of Search ..................... 144/2 Z, 3 D, 34 R, 144/34 E, 309 AC, 208 E, 208 R

[56] References Cited

U.S. PATENT DOCUMENTS 3,269,436  8/1966  Moore .
3,623,519  11/1971  Radle .
3,805,859  4/1974  Kessler et al.
3,939,886  2/1976  Tucek .
4,114,666  9/1978  Bruun ............................ 144/309 AC
4,124,047  11/1978  Dressler et al. ............. 144/309 AC
4,127,152  11/1978  Larson et al. ................ 144/309 AC

FOREIGN PATENT DOCUMENTS 43244  11/1970  Finland .
45508  4/1972  Finland .
47249  7/1973  Finland .
2165557  7/1973  Fed. Rep. of Germany ...... 144/2 Z
2810545  9/1978  Fed. Rep. of Germany ...... 144/2 Z
330079  11/1970  Sweden .
385099  9/1976  Sweden .

Primary Examiner—W. D. Bray
Attorney, Agent, or Firm—Stevens, Davis, Miller & Mosher

[57] ABSTRACT

An apparatus for delimbing previously cut trees having a tree delimber unit carried by a mobile vehicle and having an hydraulic power cylinder for pivoting the delimber unit from one side of the vehicle to the other so as to counter-balance the weight of a tree collecting mechanism.

18 Claims, 5 Drawing Figures

MOBILE MACHINE FOR PROCESSING TREES AND TRUNKS

This is a continuation of application Ser. No. 807,188, filed June 16, 1977, now abandoned.

Mobile machines for tree-delimbing purposes are previously known. Said machines besides being provided with a delimbing apparatus are often provided with a rotatable crane with a gripping device for feeding the trees into the delimbing apparatus, or with a device for severing and felling trees, and this has contributed to the weight of the machine becoming considerable. Thus, modern logging machines have tended to be heavier and more expensive so that the use thereof is not profitable other than for clear-cutting of forest stands. The weight of the machines also has the result that the mobility of the machines is limited by the bearing properties of the soil. For heavy logging machines can sometimes cause damage in the ground surface which is difficult to repair. Besides, such machines have the disadvantage not to be suitable for thinning in a forest stand because of their heavy and complicated structure and also because of their lower working capacity in thinning operations. One reason why this development, which has led to bigger and bigger machines, has not been considered as negative can be explained by the fact that the mere weight of such machines give them a good lateral stability, which means that the lifting capacity and the lifting range of the crane mounted on such machines can be considerable without jeopardizing the side or lateral stability of the machines.

The present invention makes it possible to reduce the weight of a mobile logging machine without jeopardizing the stability. A machine according to the invention can be used with advantage for delimbing and cutting tree trunks not only in a clear-cutting operation but also in a thinning operation.

A mobile machine according to the invention for treating trees and trunks comprises a mobil carrier vehicle, a log-treating apparatus carried by said vehicle and a device mounted on the vehicle for gripping trees or trunks spaced from the vehicle for the purpose of feeding same to the log-treating apparatus, and the machine is characterized according to the invention in that the log-treating apparatus for substantially increasing the lateral stability of the machine is shiftable with respect to the vehicle by means of motor means in such a manner that the centre of gravity thereof can be moved to a considerable extent in both lateral directions from a vertical centre plane through the vehicle in the direction of length thereof.

According to one embodiment of the invention the log-treating apparatus is swingably connected to the vehicle in such a manner that it can be swung in the transverse direction thereof. The swinging axis is in this case preferably vertical. The log-treating apparatus can be pivotally connected to and carried by the vehicle by means of one or more pivot arms, for instance one or more arms extending from the vehicle, for instance from an end portion thereof. In order to make it possible to effect a sometimes desirable inclination of the log-treating apparatus with respect to the ground plane the apparatus can further be swingable about a substantially horizontal axis extending perpendicularly to a vertical plane through the feeding path of the log through the apparatus.

For shifting the log-treating apparatus in the manner mentioned above the apparatus can, however, be movable otherwise, for instance slidably in the transverse direction of the vehicle, suitably by attaching the apparatus to the vehicle by means of a guide extending substantially in the transverse direction of the vehicle.

Besides being shiftable in the manner mentioned above the log-treating apparatus can be adapted to the adjustable - in dependence or independently of said shiftability - to a position in which tree trunks treated by said apparatus are delivered at the side of and preferably substantially parallel with the direction of length of the vehicle.

The invention is especially suitable to be used in mobile machines provided with a delimbing apparatus and a crane turnable around the vehicle and provided with gripping means for trees for the purpose of feeding the latter into the delimbing apparatus.

Since the log-treating apparatus is shiftably mounted on the carrier vehicle in the manner described above the machine operator can use the apparatus as a counterweight during the operation of the lifting crane for feeding trees and trunks to the log-treating apparatus. In this manner the above mentioned increase of the lateral stability of the machine is attained so that the stability of the machine is no longer dependent merely on the weight of the machine and the track gauge of the vehicle.

Since the stability of the machine is improved by the shiftability of the log-treating apparatus with respect to the carrying vehicle the weight of the machine can be reduced to a considerable extent and it can be possible to provide a single motor for the propagation of the vehicle and for driving the crane and the log-treating apparatus.

The invention will now be described in more detail in connection with the accompanying drawings which illustrate some embodiments.

Figure 1:
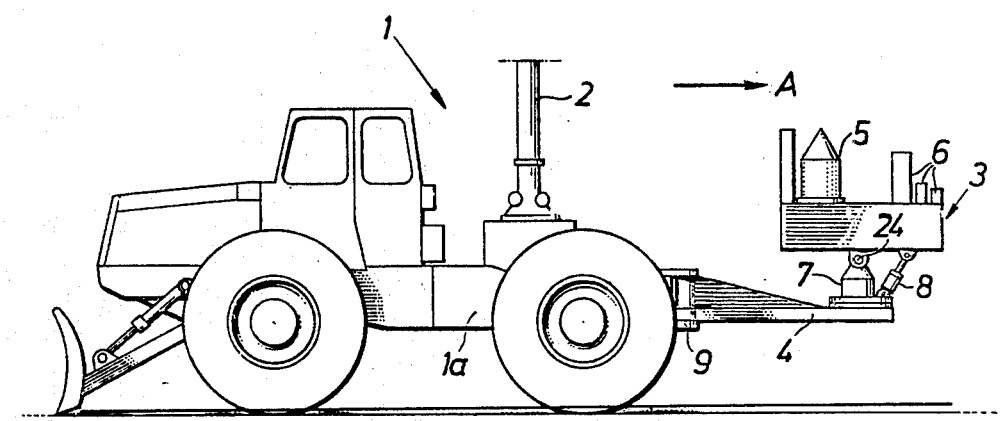
FIG. 1 is a side view of a first embodiment of a machine according to the invention and FIG. 2 is a plan view of the front portion of the machine showing the shiftability and turnability of the log-treating apparatus.

In the embodiment shown in FIG. 1 the machine comprises a base or carrier vehicle 1 in the form of a so called waist-steered four-wheeler. The vehicle carries a lifting crane of which only the crane mast 2 is indicated. The crane is of conventional type preferably a hydraulically driven crane provided with means for gripping trees and feeding same towards the log-treating apparatus 3 which in this case is a branch removing apparatus. The machine propagates stepwise in the direction of the arrow A.

The branch removing or delimbing apparatus 3 is carried by an arm 4 which is swingably connected to the chassis 1a of the vehicle 1 by means of a pivot 9 having a vertical pivot axis. The length of the arm 4 is such that the delimbing apparatus 3 can be swung laterally in both directions relatively to a vertical centre plane through the vehicle in the direction of length thereof, i.e. a vertical plane through the axis 9 in the direction of length of the vehicle, to such an extent that the centre of gravity of the apparatus is situated laterally in line with the carrying wheels of the vehicle or even laterally outside said wheels in each extreme lateral position. In this manner it is possible when lifting a tree situated at one side of and at a large distance from the machine using the crane 2 to stabilize the machine laterally by swinging the delimbing apparatus towards the opposite side to a sufficient degree. This presupposes that the delimbing apparatus has a considerable weight. The weight of the apparatus can be at least ⅓ tons, suitably at least ½ tons. Delimbing apparatuses having preferably hydraulically driven feed rollers for feeding the tree trunks are especially suitable in the present connection, since they have a considerable weight and can easily be completed with further log-treating units, for instance a cutting device for the trunks.

The placing and orientation on the machine of the delimbing apparatus 3 according to the figures make it possible to delimb the trees and place the delimbed trunks at the side of the machine. By turning the delimbing apparatus 3 on the arm 4 the apparatus can be set in other desired directions.

The delimbing apparatus 3 can be of a conventional type having rotating feed rollers 5 provided with short spikes at the periphery thereof for improved gripping action against the tree trunk and knives 6 for delimbing the tree can be movable by means of hydraulic devices in a manner known per se. A device (not shown) for cutting the trunks is preferably mounted after the delimbing apparatus 3 as seen in the direction of feed of the tree.

Hydraulic motor means 8 connected between the arm 4 and the apparatus 3 can be used for pivoting the apparatus 3 relatively to the arm 4. The delimbing apparatus 3 is carried by the arm 4 by means of a joint 7 having a vertical axis of rotation.

Figure 2:
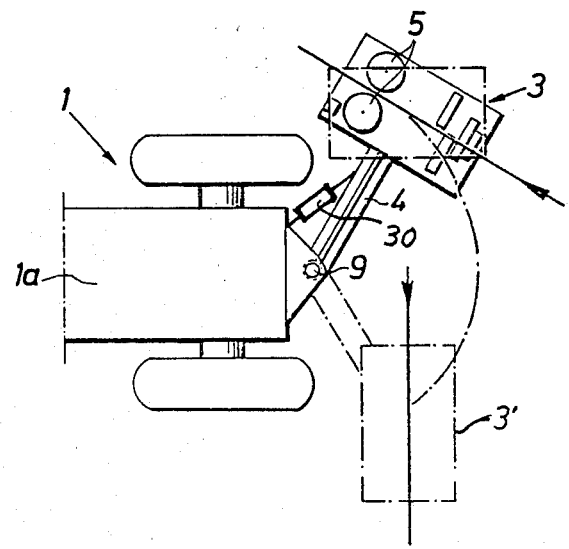

In FIG. 2 the possibility of swinging the delimbing apparatus 3 with the arm 4 is illustrated as is the possibility of turning the apparatus on the arm. The swinging or turning movement about the axis 9 is effected in a simple manner by means of known motor devices for instance hydraulically operated means which are not shown on the drawing. In the position indicated at the top of FIG. 2 by means of broken lines delimbed tree trunks will be fed out from the delimbing apparatus 3 in parallel with and at the side of the machine.

The position of the delimbing apparatus shown with broken lines 3' at the bottom of FIG. 2 is used when lifting trees from positions at the opposite side of the machine by means of the lifting crane. Also in this case the delimbing apparatus will serve as a counterweight according to what has been described above and the delimbed tree trunks will be fed out of the delimbing apparatus substantially perpendicularly to the direction of length of the vehicle 1. Also in this extreme position the delimbing apparatus is of course adjustable to a position suitable for feeding the delimbed trunks in parallel with the vehicle 1.

Figure 3:
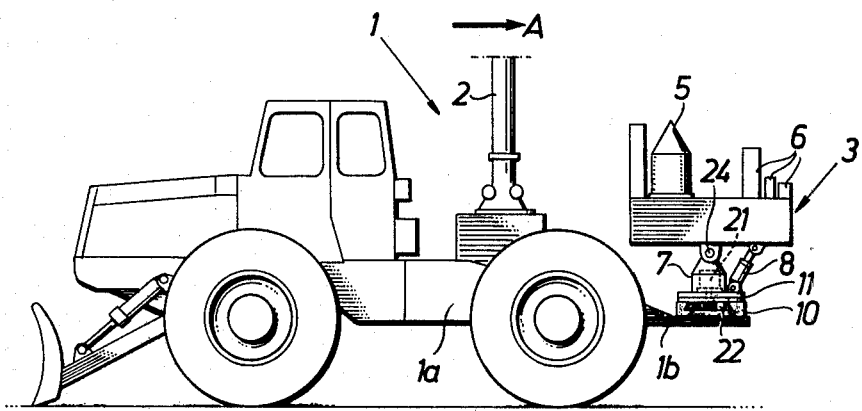
FIGS. 3 and 4 show in a similar manner a second embodiment.
Figure 4:
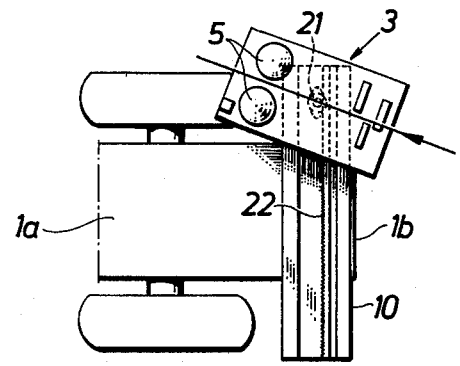

In the embodiment shown in FIGS. 3 and 4 the shifting of the delimbing apparatus 3 laterally is effected by moving the delimbing apparatus along a guide 10 which carries the delimbing apparatus and which in its turn is carried by an end portion 1b of the chassis 1a of the vehicle 1. The guide 10 extends substantially perpendicularly to the direction of length of the vehicle 1 and is substantially horizontal. The delimbing apparatus can be carried and be movable along the guide by means of a carriage 11. The movement of the delimbing apparatus along the guide can be effected mechanically in various manners, for instance by providing the guide with a toothed edge 22 and providing the apparatus at the bottom portion thereof with a toothed wheel 21 co-operating with said toothed edge, and in such case means can be provided for reversing the direction of rotation of the toothed wheel. The guide 10 can extend laterally to and, if desired, somewhat beyond the adjacent support wheels of the vehicle 1 at both sides. On the guide the delimbing apparatus can be swingable about a vertical axis in a similar manner as described in connection with FIGS. 1 and 2, this making it possible to feed trees to the apparatus from any desired direction and to deliver the delimbed trunks at any desired place and in any desired direction. Wheel 21 is rotated by a hydraulic motor (not shown).

Figure 5:
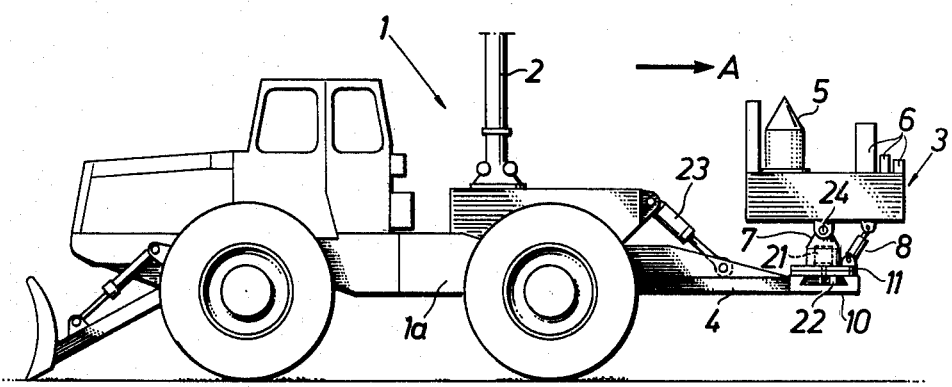
FIG. 5 is a side view of a third embodiment.

The embodiment shown in FIG. 5 differs from that according to FIGS. 1 and 4 mainly in that the delimbing apparatus is carried by a guide which instead of being direct mounted on the chassis of the vehicle 1 is mounted at the end portion of an arm 4 extending from said chassis. The arm 4 is not swingable laterally but is swingably connected to the chassis of the vehicle about a substantially horizontal axis extending in the transverse direction of the vehicle and is swingable upwards and downwards by means of a hydraulic cylinder 23.

At the connection 24 joining the delimbing apparatus 3 with the supporting tap or trunnion 7, which can consist of a housing enclosing a motor, suitably a hydraulic motor, for driving the toothed wheel 21 a joint can be provided having a horizontal axis extending substantially perpendicularly to the direction of feed of the tree trunks through the delimbing apparatus. In this case motor means, for instance a hydraulic cylinder, can be provided for swinging the delimbing apparatus about said horizontal axis so that the apparatus can be set to different inclined positions relatively to the ground plane which may be advantageous in many cases.

By the possibility of increasing the stability of the movable machine according to the invention lighter vehicles can be used than before, since the stability of the complete machine is no longer depending solely on the total weight of the machine. This means that the manufacture and the operation of the machine requires less material and fuel and the machine is more easily movable in a forest stand and does not leave any damage in the ground surface, such as those sometimes caused by heavier machines.

I claim:

1. A mobile tree processor having a mobile carrier vehicle with a vertical center plane and carrying wheels at the sides thereof, a tree processing apparatus carried on said vehicle and tree collecting means pivotally mounted on said vehicle for gripping and feeding trees to the tree processing apparatus, the improvement comprising means to increase the lateral stability of the vehicle and counter-balance the weight of the tree collecting means including power operated means on said carrier vehicle to shift the tree processing apparatus on said carrier vehicle in such a manner that the center of gravity of said apparatus is moved in either lateral direction from said vertical center plane to an outboard position at least in line with said carrying wheels so as to counter-balance the weight of the tree collecting means.

2. The tree processor of claim 1 in which the tree processing apparatus is pivotably mounted on the vehicle about a substantially vertical axis.

3. The tree processor of claim 2 in which the tree processing apparatus is carried by an arm extending from the vehicle and pivotally connected thereto.

4. The tree processor of claim 3 in which the tree processing apparatus is turnable on said arm about a substantially vertical pivot axis.

5. The tree processor of claim 4 in which the tree processing apparatus is mounted to be shifted to a position in which tree trunks processed by said apparatus are fed out from said apparatus at the side of and substantially in parallel with the vehicle.

6. The tree processor of claim 1 in which the tree processing apparatus is a delimbing apparatus comprising delimbing members and feed rollers for feeding the tree trunks through the apparatus.

7. The tree processor of claim 1 in which the log-treating apparatus is mounted on the vehicle by means of a guide device extending substantially in transverse direction of the vehicle.

8. The tree processor of claim 7 in which the guide device together with the log-treating apparatus is mounted on an arm extending from and carried by said vehicle.

9. The tree processor of claim 1 in which the tree processing apparatus is a delimbing apparatus comprising delimbing members and a device having at least two driven feed rollers for feeding the tree trunk through the apparatus.

10. The tree processor of claim 1 in which the processing apparatus is swingably mounted to the vehicle about a substantially horizontal axis extending transversly relatively to the direction of feed of the tree trunks through the apparatus.

11. The tree processor of claim 1 including means to raise and lower the tree processing apparatus in relation to said vehicle.

12. The tree processor of claim 1 in which the tree processing apparatus is pivotably mounted about a substantially horizontal axis.

13. The tree processor of claim 3 including fluid motor means to move said arm.

14. The tree processor of claim 1 in which the tree processor is mounted for movement to a position in which tree trunks processed thereby are fed out at the side of and substantially parallel to said vertical center plane.

15. In mobile tree processor having a mobile carrier vehicle with a vertical center plane and carrying wheels at the sides thereof, a tree processing apparatus carried on said vehicle and tree collecting means pivotally mounted on said vehicle for gripping and feeding trees to the tree processing apparatus, the improvement comprising means to increase the lateral stability of the vehicle comprising an arm pivotally mounted from said vehicle near said center plane for suspending said tree processing unit above the ground for swinging movement about a vertical axis to shift the tree processing apparatus on said carrier vehicle in such a manner that the center of gravity of said apparatus is moved in either lateral direction from said vertical center plane to an outboard position at least in line with said carrying wheels so as to counter-balance the weight of the tree collecting means.

16. In mobile tree processor having a mobile carrier vehicle with a vertical center plane and carrying wheels at the sides thereof, a tree processing apparatus carried on said vehicle and tree collecting means pivotally mounted on said vehicle for gripping and feeding trees to the tree processing apparatus the improvement comprising means to increase the lateral stability of the vehicle comprising a horizontal track mounted transverse to said vertical center plane and extending on each side thereof, means mounting said processing apparatus on said track for movement thereon while suspended above the ground so as to shift the tree processing apparatus on said carrier vehicle in such a manner that the center of gravity of said apparatus is moved in either lateral direction from said vertical center plane to an outboard position at least in line with said carrying wheels so as to counter-balance the weight of the tree collecting means.

17. In mobile tree processor having a mobile carrier vehicle with a vertical center plane and carrying wheels at the sides thereof, a tree processing apparatus carried on said vehicle for gripping and feeding trees to the tree processing apparatus, the improvement comprising means to increase the lateral stability of the vehicle comprising an arm pivotally mounted from said vehicle for movement about a horizontal axis, a horizontal track mounted at the distal end of said arm and transverse to said center plane and extending on each side thereof, means mounting said tree processing apparatus on said track for movement thereon while suspended above the ground, means to pivot said arm about said horizontal axis and means to pivot said tree processing apparatus in relation to said track so as to shift the tree processing apparatus on said carrier vehicle in such a manner that the center of gravity of said apparatus is moved in either lateral direction from said vertical center plane to an outboard position at least in line with said carrying wheels so as to counter-balance the weight of the tree collecting means.

18. A mobile tree processor having a mobile carrier vehicle with a vertical center plane and carrying wheels at the sides thereof, a tree delimbing apparatus comprising delimbing members and motor-driven means for feeding the tree through said apparatus and a tree collecting crane pivotally mounted on said vehicle and having means for gripping and feeding trees to the tree processing apparatus, said apparatus being wholly carried by and mounted to said vehicle with means to shift the center of gravity of said apparatus to a substantially equal extent in either lateral direction from said vertical center plane to an outboard position at least in line with said carrying wheels so as to increase the lateral stability of the processor and counter-balance the weight of the tree collecting crane and power operated means on said carrier to effect the shifting of the tree processing apparatus on said carrier vehicle.

* * * * *